United States Patent
Wang et al.

(10) Patent No.: US 11,125,552 B2
(45) Date of Patent: Sep. 21, 2021

(54) METHOD FOR THE RAPID DETECTION OF THE GEOMETRIC ACCURACY OF THE LINEAR MOTION AXIS OF AN NC MACHINE TOOL

(71) Applicant: Dalian University of Technology, Dalian (CN)

(72) Inventors: Yongqing Wang, Dalian (CN); Haibo Liu, Dalian (CN); Jiakun Wu, Dalian (CN); Kuo Liu, Dalian (CN); Kang Kuang, Dalian (CN); Dawei Li, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 309 days.

(21) Appl. No.: 16/462,234

(22) PCT Filed: Jan. 23, 2018

(86) PCT No.: PCT/CN2018/073695
§ 371 (c)(1),
(2) Date: May 19, 2019

(87) PCT Pub. No.: WO2019/144255
PCT Pub. Date: Aug. 1, 2019

(65) Prior Publication Data
US 2020/0064125 A1    Feb. 27, 2020

(51) Int. Cl.
*G01B 11/27* (2006.01)
(52) U.S. Cl.
CPC .................................... *G01B 11/27* (2013.01)
(58) Field of Classification Search
CPC ................................ G01B 11/27; G01B 21/24
See application file for complete search history.

(56) References Cited

U.S. PATENT DOCUMENTS

| 4,896,268 A | * | 1/1990 | MacGugan | ........ G01C 19/5776 701/502 |
| 5,418,611 A | | 5/1995 | Huang et al. | |

(Continued)

FOREIGN PATENT DOCUMENTS

| CN | 202393362 U | 8/2012 |
| CN | 106152976 A | 11/2016 |

(Continued)

OTHER PUBLICATIONS

Gabriele Ligorio (A Novel Kalman Filter for Human Motion Tracking With an Inertial-Based Dynamic Inclinometer, IEEE Transactions on Biomedical Engineering, vol. 62, No. 8, Aug. 2015, 11 pages) (Year: 2015).*

(Continued)

*Primary Examiner* — Tung S Lau
(74) *Attorney, Agent, or Firm* — Muncy, Geissler, Olds and Lowe, P.C.

(57) ABSTRACT

A rapid detection method for the geometric accuracy of the linear motion axis of an NC machine tool, uses accelerometers to measure the acceleration perpendicular to the direction of motion when the linear motion axis moves at a uniform speed. Firstly, the measuring device is mounted on the linear motion axis, and the upper measurement system automatically performs multi-channel acquisition and storage of the motion point acceleration data. Then, filter the acceleration data at the different speeds. Finally, the displacement data is obtained by quadratic integration of the filtered acceleration data in the time domain. Then calculate the straightness of the linear motion axis using the End Point Fit method, and complete the rapid measurement of the straightness of the linear motion axis of the machine tool. This can realize the rapid measurement of the geometric accuracy of the linear motion axis of the machine tool.

1 Claim, 4 Drawing Sheets

(56) References Cited

U.S. PATENT DOCUMENTS

| | | | | |
|---|---|---|---|---|
| 8,543,281 | B2* | 9/2013 | Petillon | G01C 19/00 701/29.2 |
| 9,519,076 | B2* | 12/2016 | Meyer | G01P 15/125 |
| 2010/0268414 | A1* | 10/2010 | Petillon | G01C 19/00 701/29.2 |
| 2011/0082009 | A1* | 4/2011 | Ranky | A63B 24/0062 482/8 |
| 2013/0201316 | A1* | 8/2013 | Binder | H04L 67/12 348/77 |
| 2014/0208823 | A1* | 7/2014 | Trusov | G01P 21/00 73/1.38 |
| 2015/0313496 | A1* | 11/2015 | Connor | A61B 5/6814 600/301 |
| 2016/0012749 | A1* | 1/2016 | Connor | A61B 5/00 600/13 |
| 2017/0164878 | A1* | 6/2017 | Connor | A61B 5/053 |
| 2017/0261528 | A1* | 9/2017 | Fain | G01P 15/123 |
| 2017/0299767 | A1* | 10/2017 | Meyer | G01P 15/125 |
| 2018/0094946 | A1* | 4/2018 | Vogl | G01C 19/5712 |

FOREIGN PATENT DOCUMENTS

| | | | | |
|---|---|---|---|---|
| CN | 106863014 | A | 6/2017 | |
| CN | 107538273 | A | 1/2018 | |
| JP | H0744565 | U * | 11/1995 | G01C 19/5726 |
| KR | 101123338 | B1 * | 3/2012 | G01C 21/165 |

OTHER PUBLICATIONS

Ann V. Rowlands (Influence of Speed and Step Frequency during Walking and Running on Motion Sensor Output, 2007, 12 pages) (Year: 2007).*

Søren Brage (Reexamination of Validity and Reliability of the CSA Monitor in Walking and Running, Copyright © 2003, 8 pages) (Year: 2003).*

* cited by examiner 2 single axis accelerometers comprise a two-way accelerometer group: $1^\#$ single axis accelerometers and $2^\#$ single axis accelerometers; ensure that the measurement direction of $1^\#$ single axis accelerometer is the n direction, and the measurement direction of $2^\#$ single axis accelerometer is the t direction, and two single axis accelerometers are respectively fixed in the detection box using nuts; set the direction $I$ as the direction of the linear motion axis, and the detection box is mounted on the linear motion axis of the NC machine tool using the side flange, and the device and the linear motion axis of the NC machine tool are clamped together.

the second step: rapid measurement of the geometric accuracy of the linear motion axis;

the measuring device is uniformly moved from one side of the linear motion axis to the other side at a high speed $v_{max}^I$, a medium speed $v_{mid}^I$, and a low speed $v_{min}^I$ in the direction $I$, and the data acquisition system of the upper computer stores the coordinates of each measuring point and outputs the digital signal data at a high frequency; the speed of movement is given by equation (1):

$$\begin{cases} v_{max}^I = V_{max}^I \\ v_{mid}^I = \dfrac{V_{max}^I}{5} \\ v_{min}^I = \dfrac{V_{max}^I}{25} \end{cases} \quad (1)$$

Fig. 7

METHOD FOR THE RAPID DETECTION OF THE GEOMETRIC ACCURACY OF THE LINEAR MOTION AXIS OF AN NC MACHINE TOOL

TECHNICAL FIELD

The invention belongs to the technical field of NC machine tools, and particularly relates to a rapid detection method for the geometric accuracy of the linear motion axis of an NC machine tool.

BACKGROUND

The linear motion axis is a basic component of NC machine tools, and its accuracy is the key factor that affects the machining quality of NC machine tools. Geometric accuracy is an important indicator of the linear motion axis and it will inevitably deteriorate throughout the machine's lifespan. As the degree of geometric accuracy declines, NC machine tools cannot only not meet the processing requirements of the product, but even cause the friction pair of the key parts of the machine tool to wear, which can result in the scrapping of the machine tool. Therefore, the acquisition of the state of the geometric accuracy of NC machine tools is of great significance for the accuracy compensation and maintenance of the machine tool in the service process. In actual production, machine tool manufacturers and users currently use laser interferometers, ball bars and other testing instruments to regularly measure the geometric accuracy of machine tools. However, these types of testing instruments are large, expensive, require complicated debugging, and have long measurement times, which seriously affect the efficiency of machine tool accuracy detection and are bound to affect the normal production process. To this end, there is an urgent need to find a rapid detection method for the geometric accuracy of the linear motion axis of NC machine tools.

The research shows that the rapid detection of the geometric accuracy of the linear axis of NC machine tools should meet the basic conditions of high measurement efficiency, strong data processing capability, small device size, low price, convenient installation and debugging, and it poses great engineering challenges. An accelerometer is used to measure the acceleration information perpendicular to the direction of motion when the linear motion axis is in motion. The quadratic time domain integral allows the motion axis deformation to be obtained, and the geometric accuracy can be estimated, which provides the possibility for the rapid detection of the geometric accuracy of the linear motion axis of an NC machine tool.

In 2010, Junjie Guo and Jindong Wang of Xi'an Jiaotong University disclosed a method for detecting the geometric accuracy of NC machine tools based on a multi-channel time-division laser measurement in the patent invention CN102062575A. The method uses a laser tracker to measure the same 3D space feed motion of the machine tool at different base points, and it has high precision.

In 2008, Hexagon Measurement Technology Ltd. and Alessandro Balsamo, Michele Verdi of INRiM disclosed a method for determining the geometric errors of a machine tool or a measuring machine in the patent invention CN101349556, which realizes the geometric error measurement by measuring a moving unit of a moving target in a space. However, the measurement device used in the above measurement method is large, expensive, and has complicated measurement steps, and it cannot meet the requirement of the rapid measurement of geometric accuracy.

SUMMARY

The object of the present invention is to overcome the shortcomings of the existing methods, and to solve the problem of the rapid detection of the linear precision of the linear motion axis of an NC machine tool, and to invent a rapid detection method for the geometric accuracy of the linear motion axis of an NC machine tool. The method adopts devices such as accelerometers, and has the advantages of low susceptibility to interference and high resolution; the device has a small number of components, the cost is low, the volume is small, the structure is compact and simple, and installation is convenient. The method utilizes the same geometric error as the noise distribution law at different speeds, and preserves the high Signal to Noise Ratio (SNR) component using filtering to provide a basis with the data for the accurate calculation of the geometric accuracy of the linear axis. Based on the principle of the continuous distribution of the spatial frequency, it fuses the measurement data of the high SNR bandwidth in each speed measurement and increases the measurement bandwidth, which lays a foundation for the accurate calculation of a machine tool's geometric accuracy. The measuring system is installed on the linear motion axis of the machine tool, which can realize the rapid measurement of the geometric accuracy of the linear motion axis of the machine tool; the operation is simple, equipment integration is high, and the automation is convenient.

Technical Solution of the Invention

A rapid detection method for the geometric accuracy of the linear motion axis of an NC machine tool, which uses accelerometers to measure the acceleration perpendicular to the direction of motion when the linear motion axis moves at a uniform speed, and obtains the deformation of the linear motion axis using the quadratic integral, and then calculates the straightness of the linear motion axis. Firstly, the measuring device is mounted on the linear motion axis, and the linear motion axis moves at three different constant speeds, and the data acquisition card automatically performs multi-channel acquisition and storage of the motion point acceleration data. Then, based on the signal having the same geometric error which can be decomposed into different frequency components, filter the acceleration data at the different speeds. Finally, the displacement data is obtained by quadratic integration of the filtered acceleration data in the time domain, and the displacement data of the three speeds is superimposed on the data to complete the linear motion axis deformation calculation. Then calculate the straightness of the linear motion axis using the End Point Fit method, and complete the rapid measurement of the straightness of the linear motion axis of the machine tool.

The specific steps are as follows:

The first step is to assemble a linear measuring device for the linear motion axes of NC machine tools.

2 single axis accelerometers comprise a two-way accelerometer group: $1^{\#}$ single axis accelerometers 1 and $2^{\#}$ single axis accelerometers 2. Ensure that the measurement direction of $1^{\#}$ single axis accelerometer 1 is the n direction, and the measurement direction of $2^{\#}$ single axis accelerometer 2 is the t direction, and two single axis accelerometers are respectively fixed in the detection box 3 using nuts. Set the direction l as the direction of the linear motion axis, and the detection box 3 is mounted on the linear motion axis 4 of the NC machine tool using the side flange, and the device and the linear motion axis of the NC machine tool are clamped together.

The second step: rapid measurement of the geometric accuracy of the linear motion axis.

The measuring device is uniformly moved from one side of the linear motion axis to the other side at a high speed $v_{max}^I$, a medium speed $v_{mid}^I$, and a low speed $v_{min}^I$ in the direction I, and the data acquisition system of the upper computer stores the coordinates of each measuring point and outputs the digital signal data at a high frequency. The speed of movement is given by equation (1):

$$\begin{cases} v_{max}^I = V_{max}^I \\ v_{mid}^I = \dfrac{V_{max}^I}{5} \\ v_{min}^I = \dfrac{V_{max}^I}{25} \end{cases} \quad (1)$$

where, $V_{max}^I$ is the maximum feed speed of the linear motion axis in the I direction. The sampling frequencies corresponding to the three speeds are given by equation (2):

$$\begin{cases} f_{max}^I = \dfrac{v_{max}^I}{0.5} \times 4 \\ f_{mid}^I = \dfrac{f_{max}^I}{v_{max}^I} \times v_{mid}^I \\ f_{min}^I = \dfrac{f_{max}^I}{v_{max}^I} \times v_{min}^I \end{cases} \quad (2)$$

wherein, the sampling frequency of the sensor under high-speed motion is $f_{max}^I$, the sampling frequency of the sensor under medium-speed motion is $f_{mid}^I$, and $f_{min}^I$, is the sampling frequency of the sensor under low-speed motion.

Through measurement, the measured acceleration subset $\Omega_{k,val}^I = \{(60_{i,val}^{I,k}, t_{i,val}^{I,k}), i \in [1,r], k \in [1,2], val \in [max, mid, min]\}$ of the linear motion axis in the I direction at the three speeds can be obtained. k is the single axis accelerometer's number, val is the measurement speed and $\alpha_{i,val}^{I,k}$ is the $k^\#$ single axis accelerometer's output signal at the i-th measurement point of the linear motion axis in the I direction when measuring the velocity val. r is the number of measurement points in the linear axis motion trajectory. $t_{i,val}^{I,k}$ is the measuring time of the i-th measurement point of the linear motion axis in the I direction when the measuring speed is val for the $k^\#$ single axis accelerometer:

$$\begin{cases} t_{i,max}^{I,k} = \dfrac{i-1}{f_{max}^I} \\ t_{i,mid}^{I,k} = \dfrac{i-1}{f_{mid}^I} \\ t_{i,min}^{I,k} = \dfrac{i-1}{f_{min}^I} \end{cases} \quad (3)$$

In equation (3) the measuring time of the i-th measurement point under high-speed motion is $t_{i,max}^{I,k}$, the measuring time of the i-th measurement point for the medium-speed motion $t_{i,mid}^{I,k}$, and $t_{i,min}^{I,k}$ is the measuring time of the i-th measurement point for the low-speed motion.

The third step is based on the filtering of the spatial frequency in continuous conditions.

First, filter the measured acceleration subsets $\Omega_{k,max}^I$, $\Omega_{k,mid}^I$, and $\Omega_{k,min}^I$ of the obtained linear motion axes in the I direction for the high-speed $v_{max}^I$, medium-speed $v_{mid}^I$, and low-speed $v_{min}^I$ measurement conditions respectively. Under high speed, medium speed and low speed measurement speed conditions val, the upper frequency limit $f_{u,val}^I$ and lower frequency limit $f_{d,val}^I$ are as given in equation (4):

$$\begin{cases} f_{u,max}^I = \dfrac{v_{max}^I}{100} \\ f_{d,max}^I = 0 \end{cases} \quad (4\text{-}1)$$

$$\begin{cases} f_{u,mid}^I = \dfrac{v_{mid}^I}{10} \\ f_{d,mid}^I = \dfrac{v_{mid}^I}{100} \end{cases} \quad (4\text{-}2)$$

$$\begin{cases} f_{u,min}^I = \dfrac{v_{min}^I}{0.5} \\ f_{d,min}^I = \dfrac{v_{mid}^I}{10} \end{cases} \quad (4\text{-}3)$$

wherein $f_{u,max}^I$ the upper limit filtering frequency for the high speed motion, and $f_{d,max}^I$ is the lower limit filtering frequency for the high speed motion. $f_{u,mid}^I$ is the upper limit filtering frequency for the medium speed motion, and $f_{d,mid}^I$ is the lower limit filtering frequency for the medium speed motion. $f_{u,min}^I$ is the upper limit filtering frequency for the low speed motion, and $f_{d,min}^I$ is the lower limit filtering frequency for the low speed motion.

According to the above operation, the filtered measurement acceleration subset $\Psi_{k,val}^I = \{(\alpha_{i,val}^{I,k}, t_{i,val}^{I,k}), i \in [1,r], k \in [1,2], val \in [max, mid, min]\}$ can be obtained. Wherein, the filtered signal $\alpha_{i,val}^{I,k}$ is the signal of the $k^\#$ single axis accelerometer filtered by the i-th measuring point of the motion axis in the I direction for the measurements peed val.

The fourth step is data fusion and the straightness calculation.

Using the time-domain integration method to integrate the filter to measure the acceleration subset $\Psi_{k,val}^I$, a subset $V_{k,val}^I = \{(\vartheta_{i,val}^{I,k}, t_{i,val}^{I,k}), i \in [1,r-1], k \in [1,2], val \in [max, mid, min]\}$ of the measurement speed can be obtained:

$$\vartheta_{i,val}^{I,k} = \dfrac{\alpha_{i+1,val}^{I,k} + 2 \sum_{m=1}^{i} \alpha_{m,val}^{I,k} - \alpha_{1,val}^{I,k}}{2 f_{val}^I} \quad (5)$$

wherein equation (5), $\vartheta_{i,val}^{I,k}$ is the measurement speed of the i-th measuring point, $\alpha_{i+1,val}^{I,k}$ is the signal filtered from the (i+1)-th measuring point, and $\alpha_{m,val}^{I,k}$ is the signal filtered from the m-th measuring point, $\alpha_{1,val}^{I,k}$ is the signal filtered from the first measuring point, and $f_{val}^I$ is filtered frequency for the measurement speed val.

Use the time-domain integration method to integrate the measurement speed subset $V_{k,val}^I$ to obtain the measurement displacement subset $S_{k,val}^I = \{(s_{i,val}^{I,k}, l_i^I), i \in [1,r-2], k \in [1,2], val \in [max, mid, min]\}$ as in equation (6):

$$s_{i,val}^{I,k} = \frac{\vartheta_{i+1,val}^{I,k} + 2\sum_{m=1}^{i}\vartheta_{m,val}^{I,k} - \vartheta_{1,val}^{I,k}}{2f_{val}^{I}} \quad (6)$$

wherein, $s_{i,val}^{I,k}$ is the measured displacement of the i-th measuring point, $\vartheta_{i+1,val}^{I,k}$ is the measured speed of the (i+1)-th measuring point, $\vartheta_{m,val}^{I,k}$ is the measured speed of the i-th measuring point, and $\vartheta_{1,val}^{I,k}$ is the measured speed of the first measuring point;

$l_i^I$ is the measured distance of the i-th measuring point in the I direction, as in equation (7):

$$l_i^I = v_{max}^I \times \frac{i-1}{f_{max}^I} \quad (7)$$

Among them, $f_{max}^I$ is the sampling frequency of the sensor for the high-speed motion, $v_{max}^I$ is the maximum feed speed of the linear motion axis in the I direction.

Then add the elements of the measurement displacement subset measured under low-speed, medium-speed and high-speed measurement conditions to complete the data fusion, as in equation (8):

$$u_i^{I,k} = s_{i,min}^{I,k} + s_{i,mid}^{I,k} + s_{i,max}^{I,k} \quad (8)$$

where the set of elements $u_i^{I,k}$ is the total set of the measured displacements, $U_k^I = \{(u_i^{I,k}, l_i^I), i \in [1, r-2], k \in [1,2]\}$. Among them, $u_i^{I,k}$ is the sum of the measured displacements under the low-speed, medium-speed and high-speed measurement conditions, $s_{i,min}^{I,k}$ the measured displacement under the low-speed measurement conditions, and $s_{i,mid}^{I,k}$ is the measured displacement under the medium-speed measurement conditions, where $S_{i,max}^{I,k}$ is the measured displacement under the high-speed measurement conditions.

Finally, calculate the straightness in the measurement direction of the $k^\#$ single axis accelerometer. The straightness calculation uses the End Point Fit method as follows:

The set of the distances from the elements of the total displacement set to the endpoint connection is $B_i^{I,k} = \{b_i^{I,k}, i \in [1, r-2], k \in [1,2]\}$ $$b_i^{I,k} = \frac{K \times l_i^I - u_i^{I,k} + u_1^{I,k}}{\sqrt{K^2 + 1}}$$

wherein, $$K = \frac{u_r^{I,k} - u_1^{I,k}}{l_r^I}, u_i^{I,k}$$

is the sum of the measured displacements of the i-th measuring point, $u_1^{I,k}$ is the sum of the measured displacements of the first measuring point, and $u_r^{I,k}$ is the sum of the measured displacements of the r-th measuring point; in $B_i^{I,k}$, $\Delta b_{max}$ is the maximum value and $\Delta k_{min}$ is the minimum value; then the straightness f is:

When $\Delta b_{min} \times \Delta b_{max} \leq 0$, $$f = \Delta b_{max} - \Delta b_{min} \quad (1)$$

When $\Delta b_{min} \geq 0 \sqcap \Delta b_{max} \geq 0$, $$f = \Delta b_{max} \quad (2)$$

When $\Delta b_{min} \leq 0 \sqcap \Delta b_{max} \leq 0$, $$f = -\Delta b_{min}. \quad (3)$$

The invention has a beneficial effect in that an accelerometer is used to measure the acceleration perpendicular to the direction of motion when the linear motion axis moves at a constant speed. The deformation of the linear motion axis is obtained using the quadratic integral, thereby realizing the rapid measurement of the geometric accuracy of the linear motion axis of an NC machine tool.

DESCRIPTION OF THE DRAWINGS

FIG. 7 is a flow diagram showing a method for rapid detection of a linear axis angular error of an NC machine tool according to the present application.

DETAILED DESCRIPTION

The specific embodiments of the present invention will be described in detail below with reference to the figures and the technical drawings.

The NC machine tool to be tested is the vertical machining center bed, and the length of the guide rail is 1500 mm.

The first step is to assemble a linear measuring device for the linear motion axes of NC machine tools.

As shown in FIG. 7, 2 single axis accelerometers comprise a two-way accelerometer: 1$^\#$ single axis accelerometer 1 and 2$^\#$ single axis accelerometer 2. Ensure that the measurement direction of 1$^\#$ single axis 1 is the n direction, and the measurement direction of 2$^\#$ single axis accelerometer 2 is the t direction, and the two single axis accelerometers are fixed in the detection box 3 using nuts. Set the direction I as the direction of the linear motion axis, and the detection box 3 is mounted on the linear motion axis of the NC machine tool using the side flange, and the device and the linear motion axis of the NC machine tool are clamped together.

The second step is the rapid measurement of the geometric accuracy of the linear motion axis.

The maximum feed rate for the motion axis in the I-direction is 531.25 mm/s. Move the measuring device from one side of the linear motion axis to the other side in the I direction at high speed $v_{max}^I = 531.25$ mm/s, medium speed $$v_{mid}^I = \frac{531.25 \text{ mm/s}}{5} = 106.25 \text{ mm/s},$$

low speed $$v_{min}^I = \frac{531.25 \text{ mm/s}}{25} = 21.25 \text{ mm/s}.$$

At the same time, the data acquisition system of the upper computer stores the coordinates of each measuring point and outputs the digital signal data. The sampling frequency of the sensor for the high speed motion is $f_{max}^I$=531.25 mm/s/ 0.5×4=4250 Hz; the sampling frequency of the sensor for the medium speed motion is $$f_{mid}^I = \frac{4250 \text{ Hz}}{531.25 \text{ mm/s}} \times 106.25 \text{ mm/s} = 850 \text{ Hz};$$

the sampling frequency of the sensor for the low speed motion is $$f_{min}^I = \frac{4250 \text{ Hz}}{531.25 \text{ mm/s}} \times 21.25 \text{ mm/s} = 170 \text{ Hz}.$$

Figure 1:
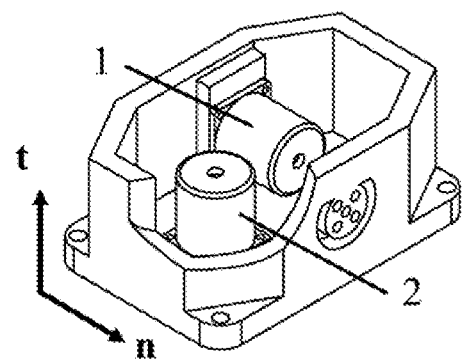
FIG. 1 shows a block diagram of the geometric accuracy rapid detection device.
Figure 2:
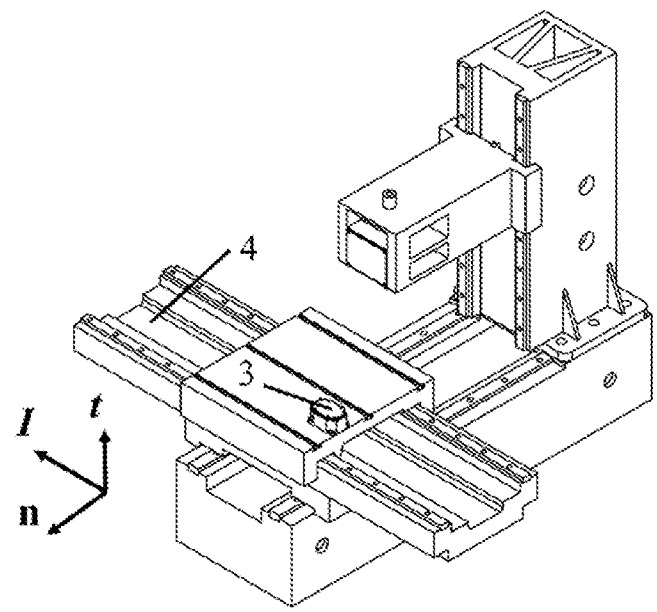
FIG. 2 shows a detection diagram of the geometric accuracy rapid detection device.
Figure 3:
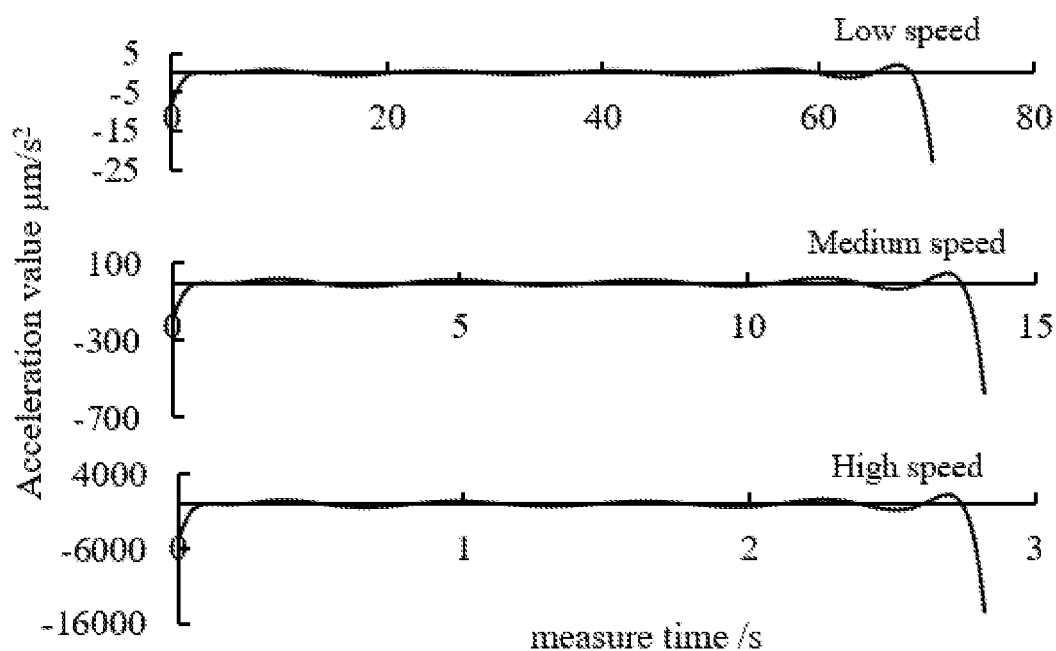
FIG. 3 shows a schematic diagram displaying the distribution of the measurement acceleration subsets in the n direction at the three speeds of the motion axis in the I-direction.

For the measurements obtained: FIG. 3-I shows the measured acceleration subset distribution of the motion axis in the n direction for the three speeds.

The third step is based on the filtering of the spatial frequency in continuous conditions.

Filter the measured acceleration subsets of the I-direction motion axes under high-speed $v_{max}^I$, medium-speed $v_{mid}^I$, and low-speed $v_{min}^I$ measurement conditions separately. Wherein, the upper limit of the filter for measuring the acceleration subset under the condition of high-speed measurement is $$f_{u,max}^I = \frac{531.25 \text{ mm/s}}{100} = 5.3 \text{ Hz},$$

and the lower limit of the filter is $f_{d,max}^I$=0 Hz. The upper limit of the filtering of the acceleration subset measured under the medium speed measurement conditions is $$f_{u,mid}^I = \frac{106.25 \text{ mm/s}}{10} = 10.6 \text{ Hz},$$

and the lower filter limit is $$f_{d,mid}^I = \frac{106.25 \text{ mm/s}}{100} = 1 \text{ Hz}.$$

The upper limit of the filtering of the acceleration subset measured under low-speed measurement conditions is $$f_{u,min}^I = \frac{21.25 \text{ mm/s}}{0.5} = 42.5 \text{ Hz},$$

and the lower filter limit is $$f_{d,min}^I = \frac{21.25 \text{ mm/s}}{10} = 2.1 \text{ Hz}.$$

Figure 4:
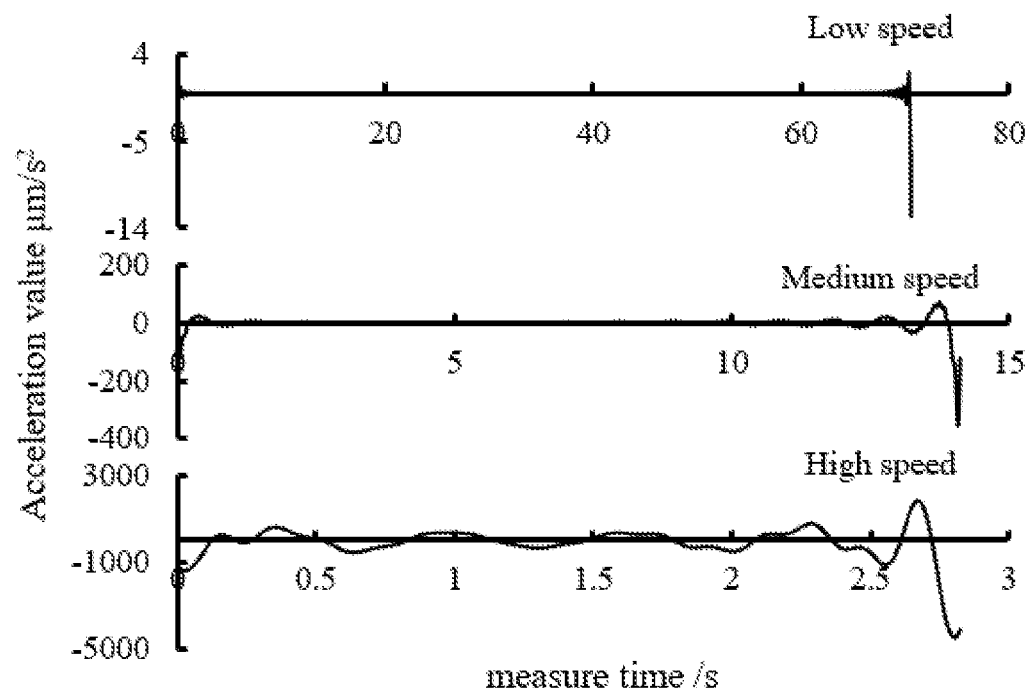
FIG. 4 shows a schematic diagram displaying the distribution of the filtered measurement acceleration subsets in the n direction at the three speeds of the motion axis in the I-direction.

Obtained according to the above operation: FIG. 4-I direction motion axis filter measurement acceleration subset distribution in the n direction at three speeds.

The fourth step, data fusion and straightness calculation

Using the time-domain integration method of the discrete points to perform a quadratic integration on the filtered measurement acceleration subset $\Psi_{k,val}^I$, then add the elements of the measurement displacement subset measured under the low-speed, medium-speed and high-speed measurement conditions.

Figure 5:
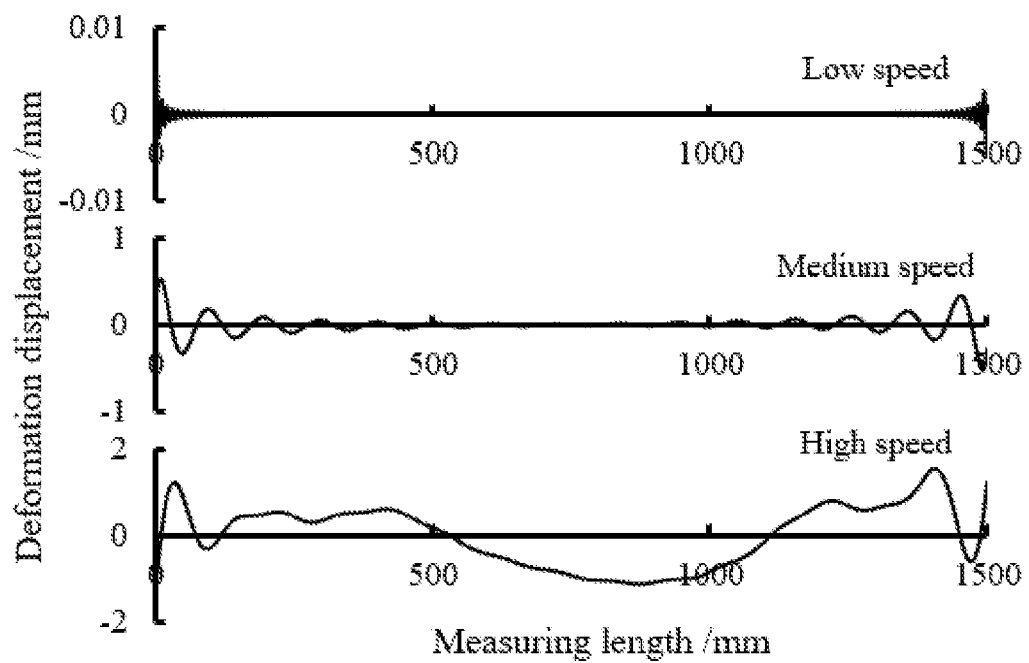
FIG. 5 shows a schematic diagram displaying the distribution of the displacement subsets in the n direction under the low speed, medium speed and high speed measurement conditions.
Figure 6:
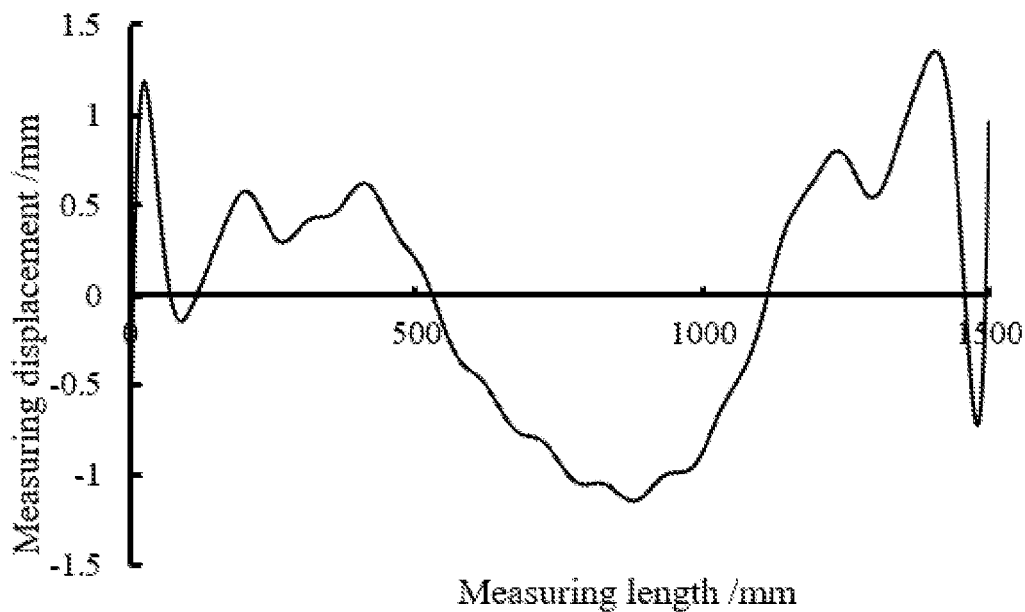
FIG. 6 shows a schematic diagram displaying the distribution of the total displacement set in the n direction. In the figure: 1-1$^\#$ acceleration sensor; 2-2$^\#$ acceleration sensor; 3—detection box; 4 is the NC machine tool's linear motion axis; I, n, t represent the I direction, n direction and t direction.

FIG. 5 shows the distribution of the displacement subsets measured in the n direction under the low speed, medium speed and high speed measurement conditions. FIG. 6 shows the distribution of the measured displacement set in the n direction. The straightness of the $1^\#$ sensor measurement direction obtained by the End Point Fit method is 2.65 μm.

This method is for the rapid detection of the geometric accuracy of the linear motion axis of a machine tool, according to the present invention. It measures the acceleration perpendicular to the direction of motion when the linear motion axis moves at a constant speed using the acceleration sensor. The deformation of the linear motion axis is obtained using the quadratic integral. Then the straightness of the linear motion axis can be calculated. This provides the possibility for the rapid detection of the geometric accuracy of NC machine tools.

The above-mentioned NC machine tool assembly deformation detection and evaluation method is only the preferred method of the present invention. Equivalent changes or modifications made in accordance with the features and principles of the present invention are intended to be included within the scope of the present invention.

The invention claimed is:

1. A method for the rapid detection of the geometric accuracy of the linear motion axis of an NC machine tool, which uses accelerometers to measure the acceleration perpendicular to the direction of motion when the linear motion axis moves at a uniform speed, and obtains the deformation of the linear motion axis using the quadratic integral, and then calculates the straightness of the linear motion axis; firstly, the measuring device is mounted on the linear motion axis, and the linear motion axis moves at three different constant speeds, and the data acquisition card automatically performs multi-channel acquisition and storage of the motion point acceleration data; then, based on the signal having the same geometric error which can be decomposed into different frequency components, filter the acceleration data at the different speeds; finally, the displacement data is obtained by quadratic integration of the filtered acceleration data in the time domain, and the displacement data of the three speeds is superimposed on the data to complete the linear motion axis deformation calculation; then calculate the straightness of the linear motion axis using the End Point Fit method, and complete the rapid measurement of the straightness of the linear motion axis of the machine tool;

wherein the specific steps are as follows:
the first step is to assemble a linear measuring device for the linear motion axes of NC machine tools;
2 single axis accelerometers comprise a two-way accelerometer group: 1# single axis accelerometers and 2# single axis accelerometers; ensure that the measurement direction of 1# single axis accelerometer is the n direction, and the measurement direction of 2# single axis accelerometer is the t direction, and two single axis accelerometers are respectively fixed in the detection box using nuts; set the direction I as the direction of the linear motion axis, and the detection box is mounted on the linear motion axis of the NC machine tool using the side flange, and the device and the linear motion axis of the NC machine tool are clamped together;
the second step: rapid measurement of the geometric accuracy of the linear motion axis;
the measuring device is uniformly moved from one side of the linear motion axis to the other side at a high speed $v_{max}^I$, a medium speed $v_{mid}^I$, and a low speed $v_{min}^I$ in the direction I, and the data acquisition system of the upper computer stores the coordinates of each measuring point and outputs the digital signal data at a high frequency; the speed of movement is given by equation (1):

$$\begin{cases} v_{max}^I = V_{max}^I \\ v_{mid}^I = \frac{V_{max}^I}{5} \\ v_{min}^I = \frac{V_{max}^I}{25} \end{cases} \quad (1)$$

where, $V_{max}^I$ is the maximum feed speed of the linear motion axis in the I direction; the sampling frequencies corresponding to the three speeds are given by equation (2):

$$\begin{cases} f_{max}^I = \frac{V_{max}^I}{0.5} \times 4 \\ f_{mid}^I = \frac{f_{max}^I}{v_{max}^I} \times v_{mid}^I \\ f_{min}^I = \frac{f_{max}^I}{v_{max}^I} \times v_{min}^I \end{cases} \quad (2)$$

wherein, the sampling frequency of the sensor under high-speed motion is $f_{max}^I$, the sampling frequency of the sensor under medium-speed motion is $f_{mid}^I$, and $f_{min}^I$ is the sampling frequency of the sensor under low-speed motion;
through measurement, the measured acceleration subset $\Omega_{k,val}^I=\{(\alpha_{i,val}^{I,k},t_{i,val}^{I,k}),i\in[1,r],k\in[1,2],val\in[max,mid,min]\}$ of the linear motion axis in the I direction at the three speeds can be obtained; k is the single axis accelerometer's number, val is the measurement speed and $\alpha_{i,val}^{I,k}$ is the k# single axis accelerometer's output signal at the i-th measurement point of the linear motion axis in the I direction when measuring the velocity val; r is the number of measurement points in the linear axis motion trajectory; $t_{i,val}^{I,k}$ is the measuring time of the i-th measurement point of the linear motion axis in the I direction when the measuring speed is val for the k# single axis accelerometer:

$$\begin{cases} t_{i,max}^{I,k} = \frac{i-1}{f_{max}^I} \\ t_{i,mid}^{I,k} = \frac{i-1}{f_{mid}^I} \\ t_{i,min}^{I,k} = \frac{i-1}{f_{min}^I} \end{cases} \quad (3)$$

in equation (3) the measuring time of the i-th measurement point under high-speed motion is $t_{i,max}^{I,k}$, the measuring time of the i-th measurement point for the medium-speed motion is $t_{i,mid}^{I,k}$, and $t_{i,min}^{I,k}$ is the measuring time of the i-th measurement point for the low-speed motion;
the third step is based on the filtering of the spatial frequency in continuous conditions;
first, filter the measured acceleration subsets $\Omega_{k,max}^I$, $\Omega_{k,mid}^I$, and $\Omega_{k,min}^I$ of the obtained linear motion axes in the I direction for the high-speed $v_{max}^I$, medium-speed $v_{mid}^I$, and low-speed $v_{min}^I$ measurement conditions respectively; under high speed, medium speed and low speed measurement speed conditions val, the upper frequency limit $f_{u,val}^I$ and lower frequency limit $f_{d,val}^I$ are as given in equation (4):

$$\begin{cases} f_{u,max}^I = \frac{V_{max}^I}{100} \\ f_{d,max}^I = 0 \end{cases} \quad (4-1)$$

$$\begin{cases} f_{u,mid}^I = \frac{v_{mid}^I}{10} \\ f_{d,mid}^I = \frac{v_{mid}^I}{100} \end{cases} \quad (4-2)$$

$$\begin{cases} f_{u,min}^I = \frac{v_{min}^I}{0.5} \\ f_{d,min}^I = \frac{v_{mid}^I}{10} \end{cases} \quad (4-3)$$

wherein, $f_{u,max}^I$ is the upper limit filtering frequency for the high speed motion, and $f_{d,max}^I$ is the lower limit filtering frequency for the high speed motion; $f_{u,mid}^I$ is the upper limit filtering frequency for the medium speed motion, and $f_{d,mid}^I$ is the lower limit filtering frequency for the medium speed motion; $f_{u,min}^I$ is the upper limit filtering frequency for the low speed motion, and $f_{d,min}^I$ is the lower limit filtering frequency for the low speed motion;
according to the above operation, the filtered measurement acceleration subset $\Psi_{k,val}^I=\{(\alpha_{i,val}^{I,k},t_{i,val}^{I,k}),i\in[1,r],k\in[1,2],val\in[max,mid,min]\}$ can be obtained; wherein, the filtered signal $\alpha_{i,val}^{I,k}$ is the signal of the k# single axis accelerometer filtered by the i-th measuring point of the motion axis in the I direction for the measurement speed val;
the fourth step is data fusion and the straightness calculation;
using the time-domain integration method to integrate the filter to measure the acceleration subset $\Psi_{k,val}^I$, a subset $V_{k,val}^I=\{\vartheta_{i,val}^{I,k},t_{i,val}^{I,k}),i\in[1,r-1],k\in[1,2],val\in[max,mid,min]\}$ of the measurement speed can be obtained:

$$\vartheta_{i,val}^{I,k} = \frac{\alpha_{i+1,val}^{I,k} + 2\sum_{m=1}^{i} \alpha_{m,val}^{I,k} - \alpha_{1,val}^{I,k}}{2f_{val}^{I}} \quad (5)$$

wherein equation (5), $\vartheta_{i,val}^{I,k}$ is the measurement speed of the i-th measuring point, $\alpha_{i+1,val}^{I,k}$ is the signal filtered from the (i+1)-th measuring point, and $\alpha_{m,val}^{I,k}$ is the signal filtered from the m-th measuring point, $\alpha_{l,val}^{I,k}$ is the signal filtered from the first measuring point, and $f_{val}^{I}$ is filtered frequency for the measurement speed val;

use the time-domain integration method to integrate the measurement speed subset $V_{k,val}^{I}$ to obtain the measurement displacement subset $S_{k,val}^{I} = \{(s_{i,val}^{I,k}, l_i^{I}), i \in [1, r-2], k \in [1,2], val \in [max, mid, min]\}$ as in equation (6).

$$s_{i,val}^{I,k} = \frac{\vartheta_{i+1,val}^{I,k} + 2\sum_{m=1}^{i} \vartheta_{m,val}^{I,k} - \vartheta_{1,val}^{I,k}}{2f_{val}^{I}} \quad (6)$$

wherein, $s_{i,val}^{I,k}$ is the measured displacement of the i-th measuring point, $\vartheta_{i+1,val}^{I,k}$ is the measured speed of the (i+1)-th measuring point, $\vartheta_{m,val}^{I,k}$ is the measured speed of the i-th measuring point, and $\vartheta_{l,val}^{I,k}$ is the measured speed of the first measuring point;

$l_i^{I}$ is the measured distance of the i-th measuring point in the I direction, as in equation (7):

$$l_i^{I} = v_{max}^{I} \times \frac{i-1}{f_{max}^{I}} \quad (7)$$

among them, $f_{max}^{I}$ is the sampling frequency of the sensor for the high-speed motion, $v_{max}^{I}$ is the maximum feed speed of the linear motion axis in the I direction;

then add the elements of the measurement displacement subset measured under low-speed, medium-speed and high-speed measurement conditions to complete the data fusion, as in equation (8):

$$u_i^{I,k} = s_{i,min}^{I,k} + s_{i,mid}^{I,k} + s_{i,max}^{I,k} \quad (8)$$

where the set of elements $u_i^{I,k}$ is the total set of the measured displacements, $U_k^{I} = \{(u_i^{I,k}, l_i^{I}), i \in [1, r-2], k \in [1,2]\}$; among them, $u_i^{I,k}$ is the sum of the measured displacements under the low-speed, medium-speed and high-speed measurement conditions, $s_{i,min}^{I,k}$ the measured displacement under the low-speed measurement conditions, and $s_{i,mid}^{I,k}$ is the measured displacement under the medium-speed measurement conditions, where $s_{i,max}^{I,k}$ is the measured displacement under the high-speed measurement conditions;

finally, calculate the straightness in the measurement direction of the $k^{\#}$ single axis accelerometer; the straightness calculation uses the End Point Fit method as follows:

the set of the distances from the elements of the total displacement set to the endpoint connection is $B_i^{I,k} = \{b_i^{I,k}, i \in [1, r-2], k \in [1,2]\}$.

$$b_i^{I,k} = \frac{K \times l_i^{I} - u_i^{I,k} + u_1^{I,k}}{\sqrt{K^2 + 1}}$$

wherein, $$K = \frac{u_r^{I,k} - u_1^{I,k}}{l_r^{I}}, u_i^{I,k}$$

is the sum of the measured displacements of the i-th measuring point, $u_1^{I,k}$ is the sum of the measured displacements of the first measuring point, and $u_r^{I,k}$ is the sum of the measured displacements of the r-th measuring point; in $B_i^{I,k}$, $\Delta b_{max}$ is the maximum value and $\Delta b_{min}$ is the minimum value; then the straightness f is:

When $\Delta b_{min} \times \Delta b_{max} \leq 0$, $$f = \Delta b_{max} - \Delta b_{min} \quad ①$$

When $\Delta b_{min} \geq 0$ ⊓ $\Delta b_{max} \geq 0$, $$f = \Delta b_{max} \quad ②$$

When $\Delta b_{min} \leq 0$ ⊓ $\Delta b_{max} \leq 0$, $$f = -\Delta b_{min}. \quad ③$$

* * * * *